United States Patent [19]

Coppola

[11] Patent Number: 4,706,606
[45] Date of Patent: Nov. 17, 1987

[54] HYGIENIC ASSEMBLY FOR USE BY CATS

[76] Inventor: Claude Coppola, Columbia Palace, 11 Avenue de Princesse Grace, Monte Carlo, Monaco, 98000

[21] Appl. No.: 924,568

[22] Filed: Oct. 29, 1986

[30] Foreign Application Priority Data

Nov. 6, 1985 [FR] France .................. 85 16290

[51] Int. Cl.⁴ .............................................. A01K 1/01
[52] U.S. Cl. ...................................................... 119/1
[58] Field of Search ................. 119/1, 61, 51 R, 52 R

[56] References Cited

U.S. PATENT DOCUMENTS

| | | | |
|---|---|---|---|
| 3,154,052 | 10/1964 | Sweeney | 119/1 |
| 3,233,588 | 2/1966 | Thomas | 119/1 |
| 3,358,647 | 12/1967 | Wilson | 119/1 |
| 3,377,990 | 4/1968 | Mitchell | 119/1 |
| 3,653,362 | 4/1972 | Davis | 119/1 |
| 3,684,155 | 8/1972 | Smith | 119/1 |
| 3,745,975 | 7/1973 | Pruchs | 119/1 |
| 3,826,229 | 7/1974 | Classe et al. | 119/1 |
| 3,827,401 | 8/1974 | Franzl | 119/1 |
| 3,831,557 | 8/1974 | Elesh | 119/1 |
| 3,886,901 | 6/1975 | Zeittier | 119/1 |
| 4,014,292 | 3/1977 | Coughlin et al. | 119/1 |
| 4,047,499 | 9/1977 | Janecek | 119/1 |
| 4,171,680 | 10/1979 | Silver et al. | 119/1 |

Primary Examiner—Paul J. Hirsch
Attorney, Agent, or Firm—Charles E. Temko

[57] ABSTRACT

The disclosure relates to a disposable litter tray including self-contained litter for use by cats and other small animals. The trays are made of pliable material and are stackable in unused condition to be separated for use. Each of the trays contains its own litter and has a horizontally oriented shoulder wall in the structure of the tray to which the edges of a heat-sealed cover sheet are attached. The device is readied for use be removing the cover sheet. When the litter has reached a condition in which it must be replaced, the entire device is folded transversely to completely enclose the litter and discarded.

4 Claims, 12 Drawing Figures

FIG. I.

HYGIENIC ASSEMBLY FOR USE BY CATS

BACKGROUND OF THE INVENTION

This invention relates generally to the field of disposable litter-containing devices which form a temporary sanitary station for use by pets, and more particularly to an improved construction in which individual units may be assembled in a container equipped with a handle so as to be compact and transportable.

The problems of relatively permanent type litter boxes are well appreciated. Such devices are normally of open pan-like configuration, which contain granulated clay, sand, sawdust, or other absorbent product, usually called "litter". The animal relieves itself upon the litter, and in a natural procedure, it will bury the same before leaving the area. While this behavior is in itself simple, in essence, it brings to the owner a set of particularly troublesome and difficult results.

This problem begins at the point of purchase of the absorbent product which is generally sold in bags weighing five to ten pounds on average. These bags are often covered with dust spreading by capillary action from the inside of nearby bags, and are sometimes even penetrated.

In order to prepare a new "litter" area, the housekeeper must first dispose of the used litter in the tray, and then proceed to clean the same. To do this, the tray must be grasped along its edges, and dumped into a garbage can or directly into garbage. Very often, all of the litter is not disposed of in this manner, since some of the same will stick to the inner surface of the tray, and require a separate scrubbing procedure.

It is known in the art to provide disposable devices, which normally include a container of disposable material having some means for closing the same to enclose waste, so that the problem of maintaining the permanent tray in sanitary condition is avoided. Some of these devices include a permanent stand accommodating a disposable receptacle therein, the receptacle being removed and replaced by a fresh one at periodic intervals. Others feature a plastic receptacle accommodating a charge of litter, both receptacle and litter being discarded when the litter has become soiled. For the most part, such prior art devices have proven to be difficult to use, too cumbersome, too delicate, and too costly.

SUMMARY OF THE INVENTION

Briefly stated, the invention contemplates the provision of an improved device of the class described in which the above-mentioned disadvantages have been substantially eliminated. The disclosed embodiment is in the form of an assembly comprising a plurality of trays, with or without litter, which are conveniently stacked prior to use to facilitate their transport. Once separated from each tray, the shape and size of which may be varied, will include a transversely extending shoulder wall extending around the peripheral sides of the tray, and facing inwardly upon which a heat sealed sheet which maintains the litter in position within the tray is attached. The sheet may be cut out for use, or may be provided with a small tab enabling its removal to expose the litter for use. The sheet is placed at a given height inside the tray to provide a cavity in which the litter is disposed. After use, the tray is folded transversely to permit the joining of the opposite end edges together to form a box-like enclosure. Means is provided to maintain the box closed, thereby avoiding risks of accidental spillage and maintain conditions of optimum hygiene. To facilitate the folding of the tray at the center to form the box, provision is made for a pre-fold in the form of a ridge at the bottom of the tray and well as structure in the form of accordian bellows on the side parts of the box on either side of the fold.

BRIEF DESCRIPTION OF THE EMBODIMENT

In the drawing, to which reference will be made in the specification, similar reference characters have been employed to designate corresponding parts throughout the several views.

DETAILED DESCRIPTION OF THE DISCLOSED EMBODIMENT

Figure 1:
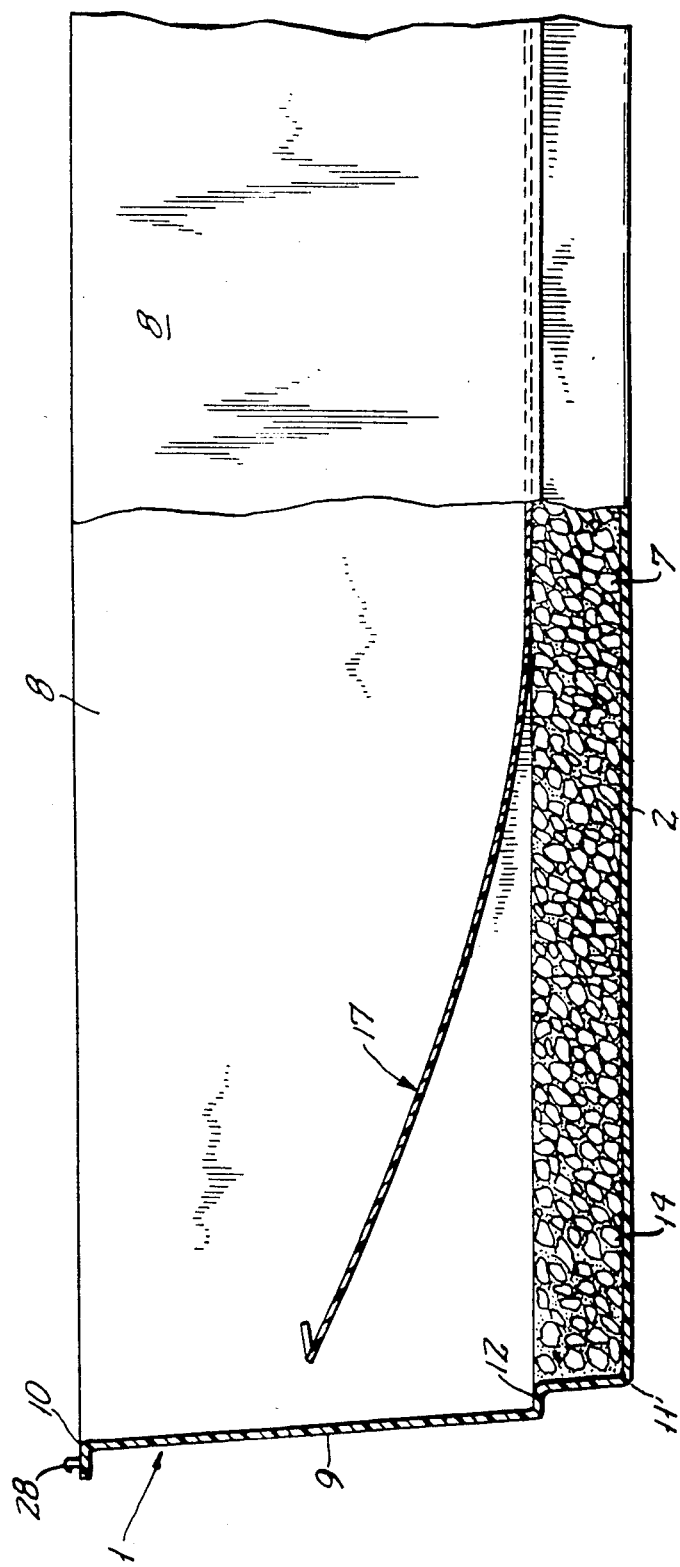
FIG. 1 is a fragmentary longitudinal sectional view of an embodiment of the invention.

In accordance with the invention, the device, generally indicated by reference character 1 (FIG. 2) is in the form of a rectangular blank of material containing a quantity of particulate litter 7 of known type. It includes a bottom wall 2, a pair of side walls 8, and a pair of end walls 9. The device is bounded by a continuous upper edge 10 and a continuous lower edge 11. Each of the side and end walls forms a continuous horizontal shoulder 12 disposed medially between the edges 10 and 11 beneath which is a rectangular recess 14 for the litter 7. Overlying the shoulder 12 is a flexible cover sheet 17 of impervious material, the peripheral edge surfaces 18 of which are secured either by heat sealing or an adhesive (not shown) to the shoulder 12.

Figure 4:
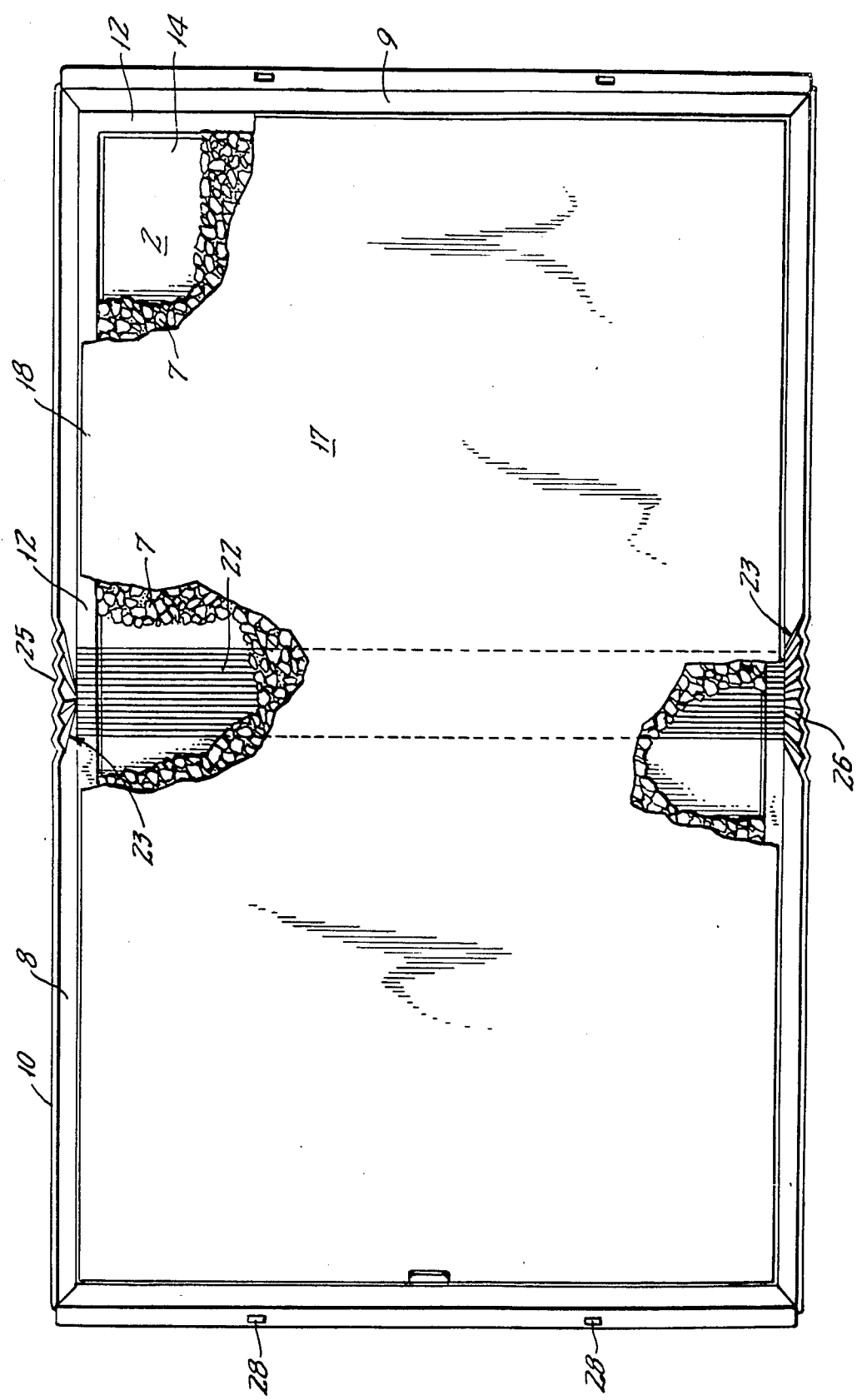
FIG. 4 is a top plan view showing an individual tray element.
Figure 5:
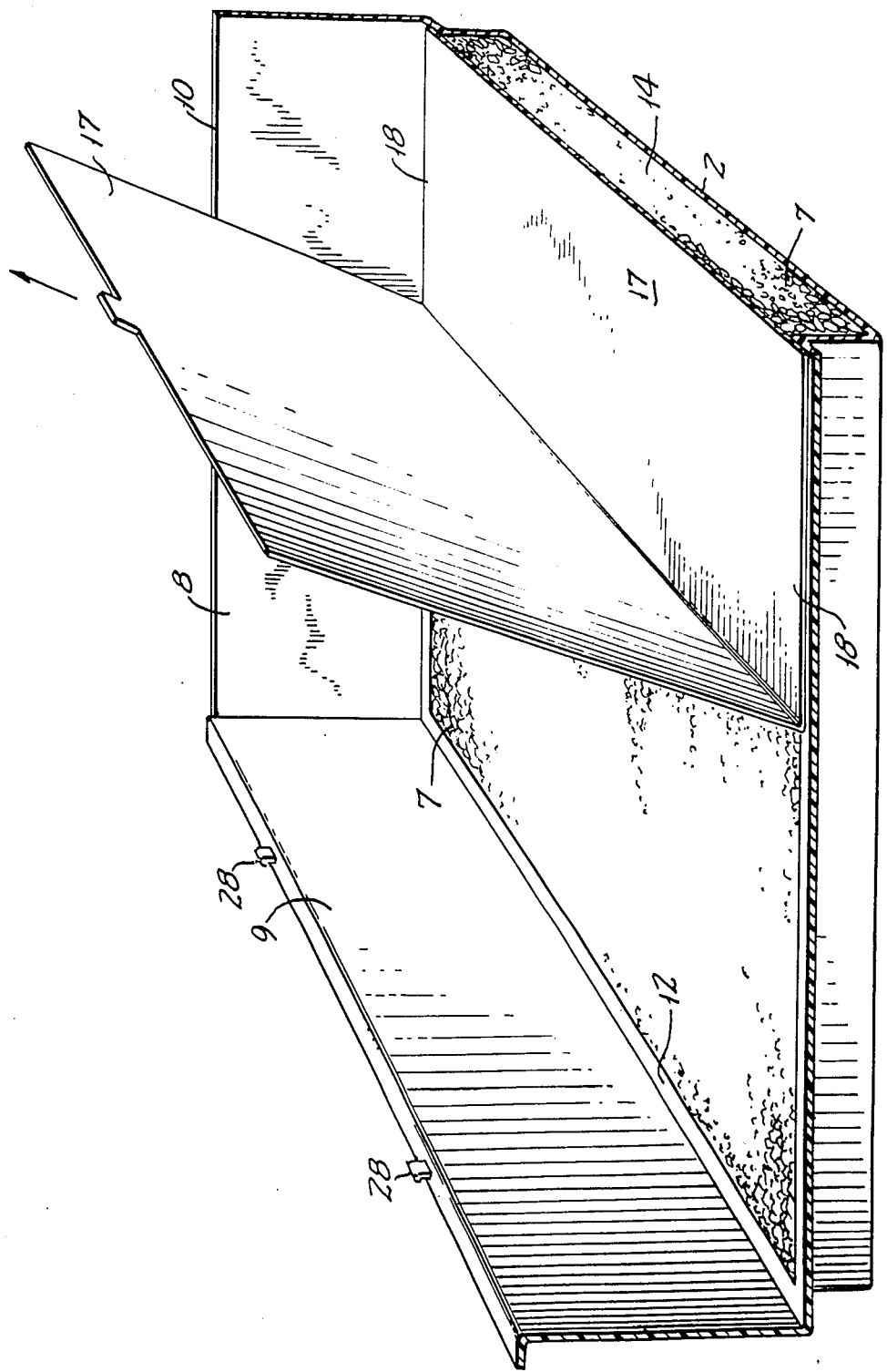
FIG. 5 is a fragmentary sectional view in perspective showing the removal of a protective sheet to expose compacted litter positioned therebeneath.

FIG. 4 illustrates a plurality of preformed score lines 22 to facilitate folding of the device transversely after the litter has been sufficiently soiled to warrant discarding the entire device. Side areas 23 are also suitably scored as at 25 and 26, the latter showing a series of fan-shaped folds, while the former shows continuations of the lines 22.

Figure 2:
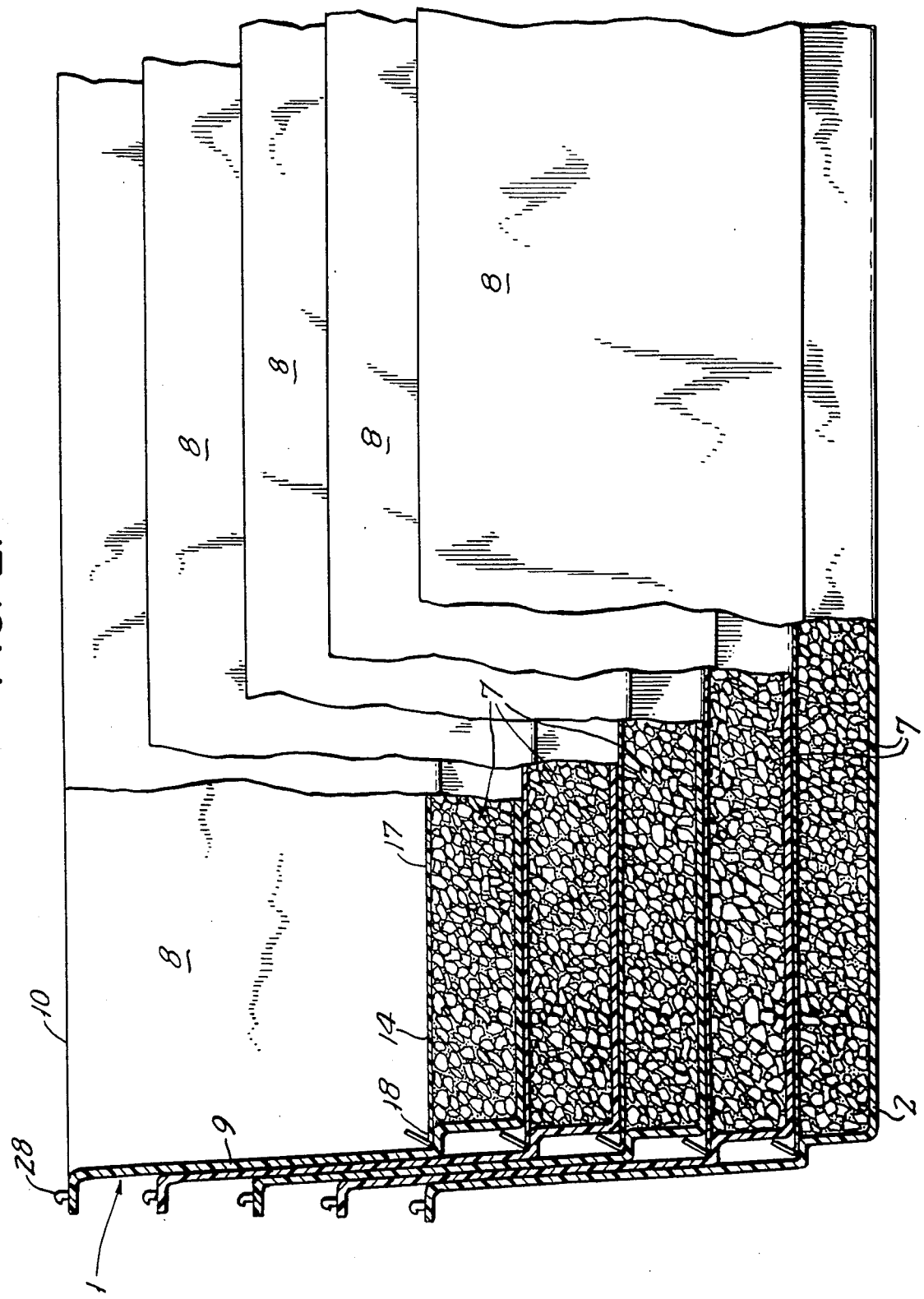
FIG. 2 is a fragmentary longitudinal sectional view thereof showing a plurality of structures illustrated in FIG. 1 in mutually stacked relation.
Figure 3:
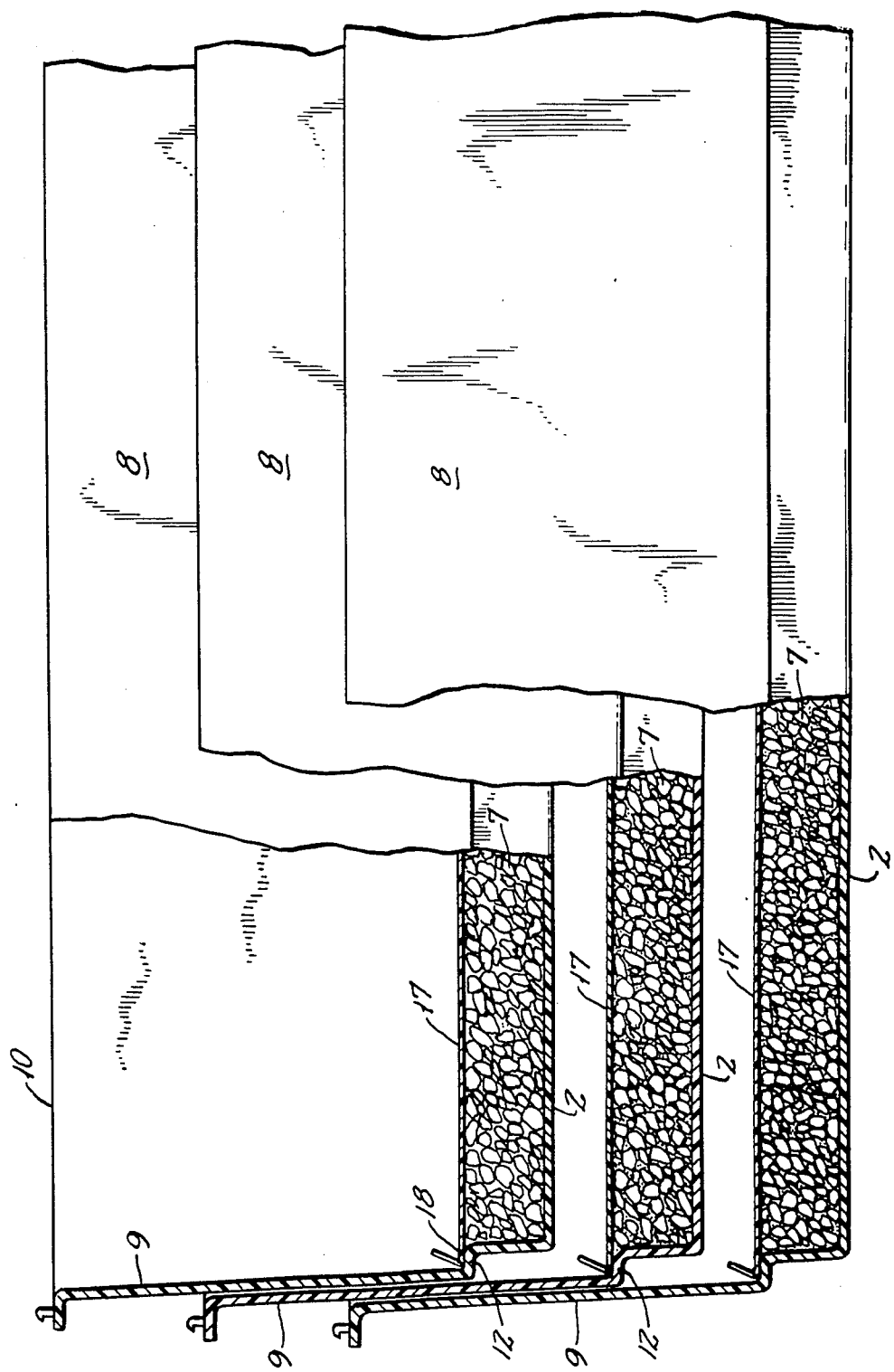
FIG. 3 is a similar fragmentary longitudinal sectional view corresponding to that seen in FIG. 2, but showing the component elements in partially separated condition.
Figure 12:
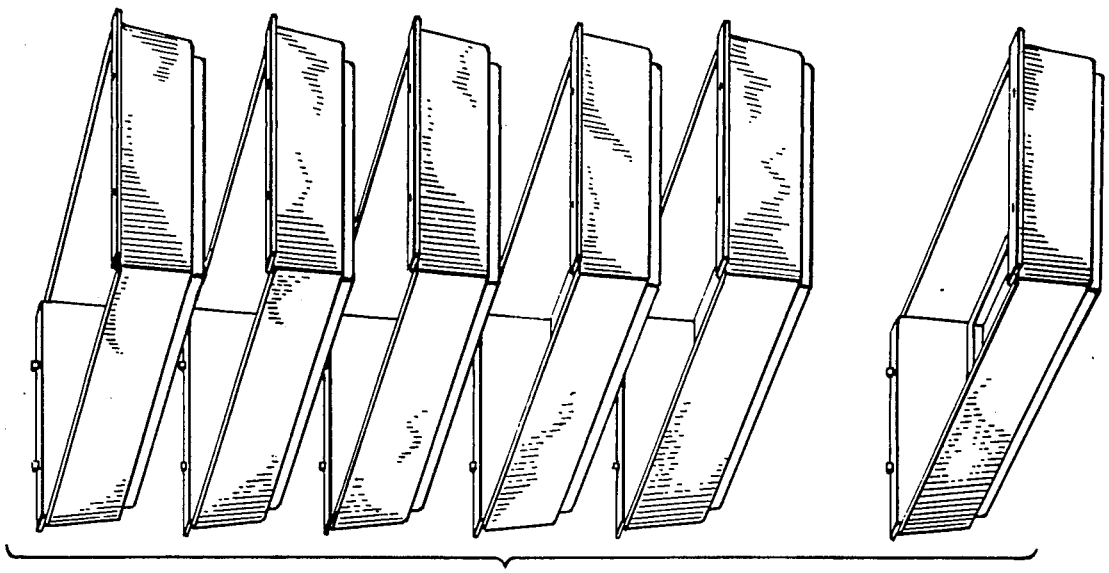
FIG. 12 is an exploded view in perspective of a plurality of stacked litter units
Figure 8:
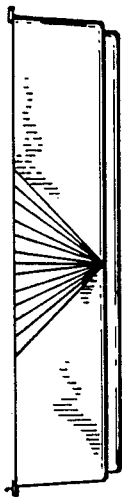
FIG. 8 is a side elevational view showing a single unit.
Figure 9:
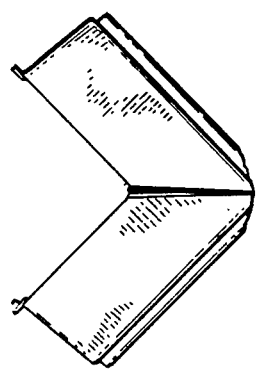
FIG. 9 is a perspective view showing the unit of FIG. 8 in partially folded condition.
Figure 10:
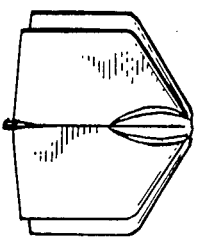
FIG. 10 is a side elevational view showing the element in fully folded condition.
Figure 11:
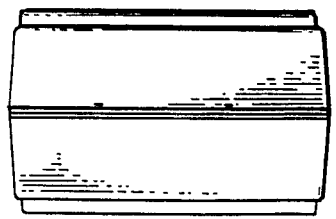
FIG. 11 is a top plan view as seen from the upper portion of FIG. 10.
Figure 6:
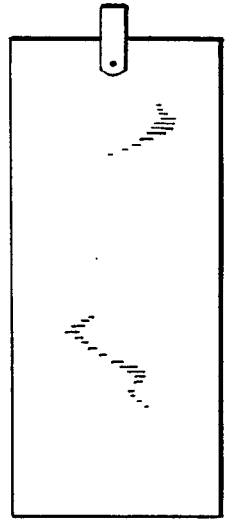
FIG. 6 is a schematic side elevational view showing a plurality of stacked litter units with a detachable carrying handle.
Figure 7:
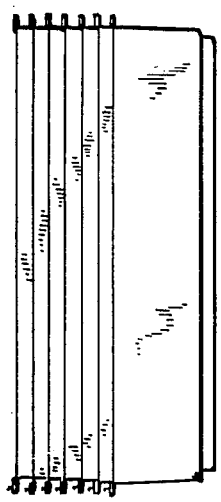
FIG. 7 is a side elevational view showing units in stacked relation.

As best seen in FIGS. 2, 3 and 12, a plurality of devices can be conveniently stacked together for convenience in carrying, to be separated individually as shown in FIG. 12 prior to use. At the completion of use, the device is folded commencing as shown in FIG. 9, to a completely folded condition shown in FIG. 12, wherein the abutting segments of the upper edge 10 are maintained in this condition by suitable clips 28 of known type. In the alternative, the condition shown in FIG. 11 may be maintained by a strip of adhesive pressure-sensitive tape (not shown).

I wish it to be understood that I do not consider the invention limited to the precise details of structure shown and set forth in this specification, for obvious modifications will occur to those skilled in the art to which the invention pertains.

I claim:

1. An improved disposable litter tray for use by pets comprising: a planar bottom wall and a plurality of contiguous side and end walls interconnected to said bottom wall in mutually converging configuration, said side and end walls each forming a continuous horizontally oriented medially positioned shoulder; a flexible cover sheet of dimensions corresponding to that of said shoulder secured at peripheral edges thereof to said shoulder in sealed relation; and a quantity of litter disposed within said tray upon said bottom wall and beneath said cover sheet; said bottom wall having a transversely extending preformed fold therein, the area on each of a pair of opposed side walls adjacent said fold having preformed pleats therein, whereby said cover sheet may be removed prior to use to expose said litter, and said tray may be folded transversely after the use to abut opposed segments of the upper continuous edge of said side and end walls to completely enclose the contents of said tray.

2. An improved assembly consisting of a plurality of trays in accordance with claim 1 in mutually stacked relation, and carrying strap means associated with said assembly.

3. An improved tray in accordance with claim 1, further characterized in said sheet being secured to said shoulder as a result of a heat sealing operation.

4. An improved tray in accordance with claim 1, further characterized in said sheet being secured to said shoulder by adhesive means.

* * * * *